United States Patent
Choe et al.

(10) Patent No.: US 10,466,711 B2
(45) Date of Patent: Nov. 5, 2019

(54) MOVING ROBOT AND CONTROLLING METHOD THEREOF

(71) Applicant: LG ELECTRONICS INC., Seoul (KR)

(72) Inventors: Suuk Choe, Seoul (KR); Minuk Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 95 days.

(21) Appl. No.: 15/683,040

(22) Filed: Aug. 22, 2017

(65) Prior Publication Data

US 2018/0052468 A1 Feb. 22, 2018

(30) Foreign Application Priority Data

Aug. 22, 2016 (KR) .......................... 10-2016-0106366

(51) Int. Cl.
  *G05D 1/02* (2006.01)
  *A47L 9/28* (2006.01)
  *B60L 53/36* (2019.01)

(52) U.S. Cl.
  CPC .......... *G05D 1/0225* (2013.01); *A47L 9/2852* (2013.01); *B60L 53/36* (2019.02);
  (Continued)

(58) Field of Classification Search
  CPC .. G05D 1/0225; G05D 1/0242; G05D 1/0274; G05D 1/0246; A47L 9/2852; B60L 11/1833
  See application file for complete search history.

(56) References Cited

U.S. PATENT DOCUMENTS

| | | | | | |
|---|---|---|---|---|---|
| 4,119,900 A | * | 10/1978 | Kremnitz | ............. | G05B 13/047 318/580 |
| 6,764,373 B1 | * | 7/2004 | Osawa | ................... | B25J 19/005 180/169 |

(Continued)

FOREIGN PATENT DOCUMENTS

| KR | 10-0632436 | 10/2006 |
|---|---|---|
| KR | 10-2008-0073626 | 8/2008 |

(Continued)

OTHER PUBLICATIONS

Taiwanese Office Action dated Aug. 20, 2018 issued in Application No. 106128313 (with English Translation).

(Continued)

*Primary Examiner* — Behrang Badii
*Assistant Examiner* — Daniel L Greene
(74) *Attorney, Agent, or Firm* — KED & Associates LLP

(57) ABSTRACT

Disclosed are a moving robot and a controlling method thereof. The moving robot which selectively moves an area based on a stored map to search a charging station within a short time when there is a need for charging due to consumption of a battery. Although a position of the moving robot is optionally changed, the moving robot recognizes a position thereof so that it is easy to move between areas and an influence according to complexity of an obstacle is reduced. Since the charging station in an area may be searched through small moving by setting a specific point in the area as a search position to search the charging station, stop of an operation during searching the charging station may be solved and the charging station may be exactly searched within a short time.

17 Claims, 14 Drawing Sheets

(52) U.S. Cl.
CPC ......... *G05D 1/0242* (2013.01); *G05D 1/0274* (2013.01); *A47L 2201/022* (2013.01); *A47L 2201/04* (2013.01); *G05D 1/0246* (2013.01); *G05D 2201/0203* (2013.01); *G05D 2201/0215* (2013.01)

(56) References Cited

U.S. PATENT DOCUMENTS

| | | | | |
|---|---|---|---|---|
| 7,787,991 | B2* | 8/2010 | Jeung | G05D 1/0214 15/319 |
| 2002/0007230 | A1* | 1/2002 | Ueno | B25J 19/005 700/245 |
| 2003/0105534 | A1* | 6/2003 | Hara | B25J 9/1682 700/2 |
| 2005/0113973 | A1* | 5/2005 | Endo | B25J 9/161 700/245 |
| 2005/0166413 | A1* | 8/2005 | Crampton | B25J 13/088 33/503 |
| 2007/0016328 | A1* | 1/2007 | Ziegler | A47L 5/14 700/245 |
| 2008/0140254 | A1* | 6/2008 | Jeung | G05D 1/0214 700/245 |
| 2009/0049640 | A1* | 2/2009 | Lee | A47L 9/20 15/319 |
| 2010/0324736 | A1* | 12/2010 | Yoo | G05D 1/0225 700/259 |
| 2011/0032110 | A1* | 2/2011 | Taguchi | B60L 3/12 340/636.1 |
| 2012/0089329 | A1* | 4/2012 | Kim | G01C 21/3461 701/426 |
| 2012/0136574 | A1* | 5/2012 | Kobayashi | B60L 3/12 701/533 |
| 2013/0073088 | A1* | 3/2013 | Lee | G05D 1/0225 700/259 |
| 2013/0326839 | A1* | 12/2013 | Cho | A47L 9/2805 15/319 |
| 2013/0338831 | A1* | 12/2013 | Noh | B25J 9/1676 700/259 |
| 2013/0345976 | A1* | 12/2013 | Li | G01C 21/3476 701/533 |
| 2014/0023279 | A1 | 1/2014 | Fahn et al. | |
| 2015/0057800 | A1 | 2/2015 | Cohen et al. | |
| 2015/0168166 | A1* | 6/2015 | Sakamoto | G05D 1/0214 701/400 |
| 2015/0212500 | A1* | 7/2015 | Akabane | G05D 1/0274 700/275 |
| 2017/0282735 | A1* | 10/2017 | Yamamura | B60L 11/1816 |
| 2018/0035606 | A1* | 2/2018 | Burdoucci | A01D 34/008 |

FOREIGN PATENT DOCUMENTS

| | | |
|---|---|---|
| KR | 10-2008-0078327 | 8/2008 |
| KR | 10-2010-0092807 | 8/2010 |
| TW | 200948333 | 12/2009 |
| TW | 201303538 | 1/2013 |
| TW | I388956 | 3/2013 |
| TW | 201335728 | 9/2013 |
| TW | 201405486 | 2/2014 |

OTHER PUBLICATIONS

International Search Report dated Dec. 22, 2017 issued in Application No. PCT/KR2017/009100.

* cited by examiner (a)

(b)

(c)

(d)

(a)

(b)

(c)

(d)

(a)

(b)

MOVING ROBOT AND CONTROLLING METHOD THEREOF

CROSS-REFERENCE TO RELATED APPLICATION(S)

This application claims priority under 35 U.S.C. § 119 to Korean Application No. 10-2016-0106366 filed on Aug. 22, 2016, whose entire disclosure is hereby incorporated by reference.

BACKGROUND

1. Field

The present invention relates to a moving robot and a controlling method thereof, and more particularly, to a moving robot which moves, searches and returns to a charging station and a controlling method thereof.

2. Background

A moving robot runs an area to be cleaned to absorb foreign materials such as dust from a floor and to clean the floor.

The moving robot includes a chargeable battery, freely moves to move by itself using operation power of the chargeable battery, and absorbs foreign materials of the floor during moving to clean the floor.

The moving robot detects a distance to an obstacle such as furniture, office supplies, and walls, and controls driving of a left wheel and a right wheel to perform an obstacle avoidance operation.

The moving robot returns to a charging station if necessary to charge a battery.

A moving robot according to the related art searches a charging station by moving a wall following along a wall without division of an area.

However, when the charging station is searched through the wall following, since the moving robot moves the whole space, it takes a long time.

Since furniture are disposed in the area so that there are a plurality of obstacles and a range capable of searching a signal is restrictive, it takes a long time to search the charging station.

In particular, when an inner space is divided into a plurality of areas, since the moving robot should move each area to search the charging station, the battery is discharged before finding the charging station due to increase of a search time so that the moving robot stops as a corresponding point.

Accordingly, there is a need for a method of searching the charging station within a short time while rapidly moving the area.

BRIEF DESCRIPTION OF THE DRAWINGS

The embodiments will be described in detail with reference to the following drawings in which like reference numerals refer to like elements wherein.

DETAILED DESCRIPTION

The advantages, the features, and schemes of achieving the advantages and features of the disclosure will be apparently comprehended by those skilled in the art based on the embodiments, which are described later in detail, together with accompanying drawings. Various example embodiments will be described more fully hereinafter with reference to the accompanying drawings, in which some example embodiments are shown. The present inventive concept may, however, be embodied in many different forms and should not be construed as limited to the example embodiments set forth herein. In the figures, reference numbers refer to the same or equivalent parts of the present invention throughout the specification.

Further, in a mobile robot, a control unit and each part may be implemented as one or more processors, or may be implemented as a hardware device.

Figure 1:
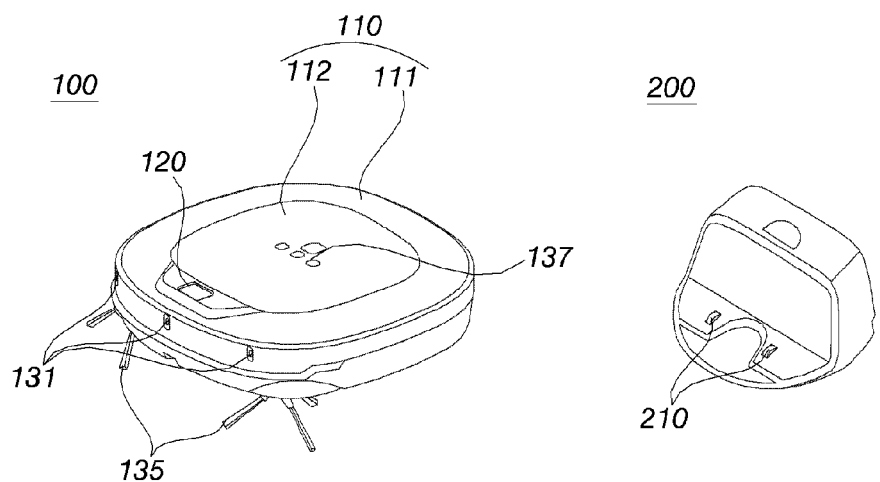
FIG. 1 is a perspective view illustrating a moving robot and a charging station for charging the moving robot according to an embodiment of the present invention.
Figure 2:
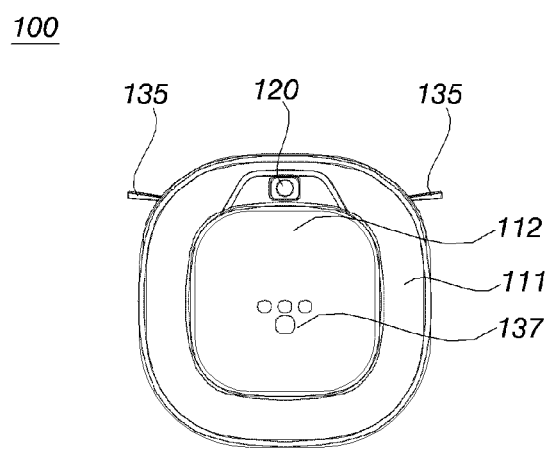
FIG. 2 is a view illustrating a top surface of the moving robot shown in FIG. 1.

Hereinafter, dishwasher according to the exemplary embodiment of the present invention will be described with reference to the accompanying drawings. FIG. 1 is a perspective view illustrating a moving robot and a charging station for charging the moving robot according to an embodiment of the present invention, FIG. 2 is a view illustrating a top surface of the moving robot shown in FIG.

Figure 3:
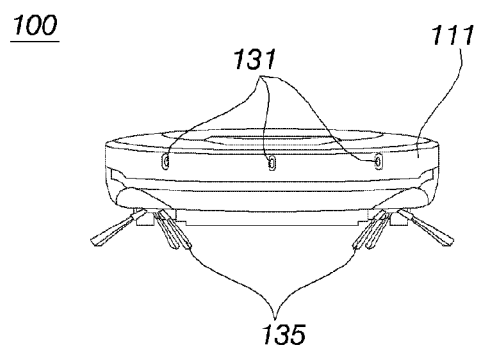
FIG. 3 is a view illustrating a front surface of the moving robot shown in FIG. 1.
Figure 4:
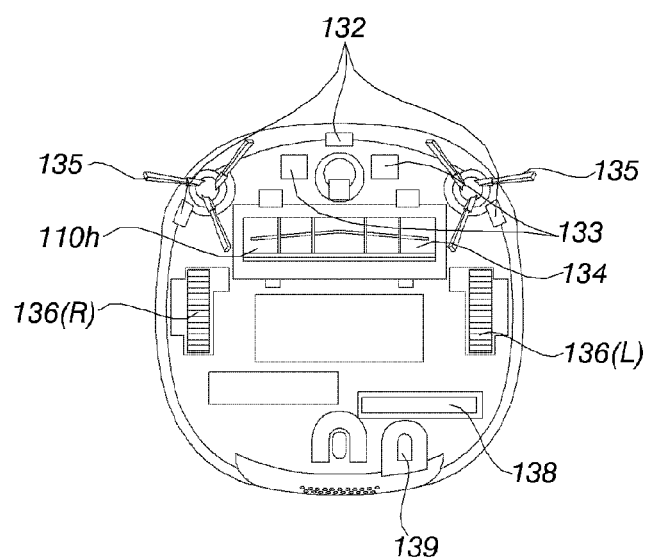
FIG. 4 is a view illustrating a bottom surface of the moving robot shown in FIG. 1.

1, FIG. 3 is a view illustrating a front surface of the moving robot shown in FIG. 1, and FIG. 4 is a view illustrating a bottom surface of the moving robot shown in FIG. 1.

As shown in FIG. 1 to FIG. 4, a moving robot 100 includes a body 110 and an image acquiring unit 120 configured to acquire an image around the body 110. Hereinafter, each part of the body 110 is defined as follows. A part orienting toward a ceiling in a running area refers to a top surface (see FIG. 2). A part orienting toward a bottom in the running area refers to a bottom surface (see FIG. 4). A part orienting a running direction among parts configuring a periphery of the body 110 between the top surface and the bottom surface refers to a front surface (see FIG. 3).

The moving robot 100 includes a running unit 160 configured to move the body 110. The running unit 160 include at least one driving wheels 136 configured to move the body 110. The running unit 160 includes a driving motor (not shown) connected to the driving wheel 136 to rotate the driving wheel. The driving wheels 136 may be provided at left and right sides of the body 110, respectively. Hereinafter, the driving wheels 136 include a left wheel 136(L) and a right wheel 136(R).

The left wheel 136(L) and the right wheel 136(R) may be driven by one driving motor. However, if necessary, a left wheel driving motor for driving the left wheel 136L and a right wheel driving motor for driving the right wheel 136R may be included. A running direction of the body 110 may be changed to a left side or a right side by changing rotating speed of the left wheel 136L and the right wheel 136R.

An inlet 110h may be formed at the bottom surface of the body 110 and sucks air. The body 110 may be provided therein with a sucking device (not shown) configured to provide suction force so that air may be sucked through the inlet 110h and a dust barrel (not shown) configured to collect dust sucked together with air through the inlet 110h.

The body 110 may include a case 111 configured to form a space in which various components configuring the moving robot 100 are received. The case 111 may be formed therein with an opening portion for inserting and separating a dust barrel. A dust barrel cover 112 for opening/closing the opening portion may be rotatably provided with respect to the case 111.

A roll type main brush 134 includes brushes exposed through the inlet 110h. An auxiliary brush 135 is located at a front side of a bottom surface of the body 110 and includes a brush configured by a plurality of wings which radially extend. Dusts are separated from a bottom in a running area by rotating the brushes 134 and the auxiliary brush 135. The dusts separated from the bottom are sucked through the inlet 110h and are collected in the dust barrel.

The battery 138 supplies power necessary for an overall operation of the moving robot as well as the driving motor. When the battery 138 is discharged, the moving robot 100 may return to a charging station 200 for charging. During the return running, the moving robot 100 may search a position of the charging station by itself.

The charging station 200 may include a signal transmitter (not shown) configured to transmit a predetermined return signal. Although the return signal may be an ultrasonic signal or an infrared signal, the present invention is not limited thereto.

The moving robot 100 may include a signal sensor (not shown) configured to receive the return signal. The charging station 200 may transmit an infrared signal through the signal transmitter and the signal sensor may include an infrared sensor configured to detect an infrared signal. The moving robot 100 moves to a position of the charging station 200 according to the infrared signal from the charging station 200 to dock with the charging station 200. Through the above docking, charging is achieved between a charging terminal of the moving robot 100 and a charging terminal 210 of the charging station 200.

The image acquiring unit 120 may include a digital camera configured to shoot a running area. The digital camera may include an image sensor (e.g., CMOS image sensor) including at least one optical lens and a plurality of photodiodes imaged by light transmitted through the optical lens and a digital signal processor (DSP) configuring an image based on a signal output from the photodiodes. The DSP may generate a still image and a moving image configured by frames including the still image.

Preferably, the image acquiring unit 120 is provided at a top surface of the body 110 and acquires an image with respect to a ceiling in a running area, but a position and a shooting range of the image acquiring unit 120 are not limited thereto. For example, the image acquiring unit 120 may acquire a front image of the body 110.

The moving robot 100 may further include an obstacle sensor 131 configured to detect a front obstacle. The moving robot 100 may include a cliff sensor 132 configured to detect whether there is a cliff on a bottom in a running area and a lower camera sensor 139 configured to acquire an image of a bottom.

Further, the moving robot 100 includes an operation unit 137 to input on/off or various commands. Various control command necessary for an overall operation of the moving robot 100 may be input through the operation unit 137. Further, the moving robot 100 may include an output unit (not shown) to display preparation information, a battery state, an operation mode, an operation state, and an error state.

Figure 5:
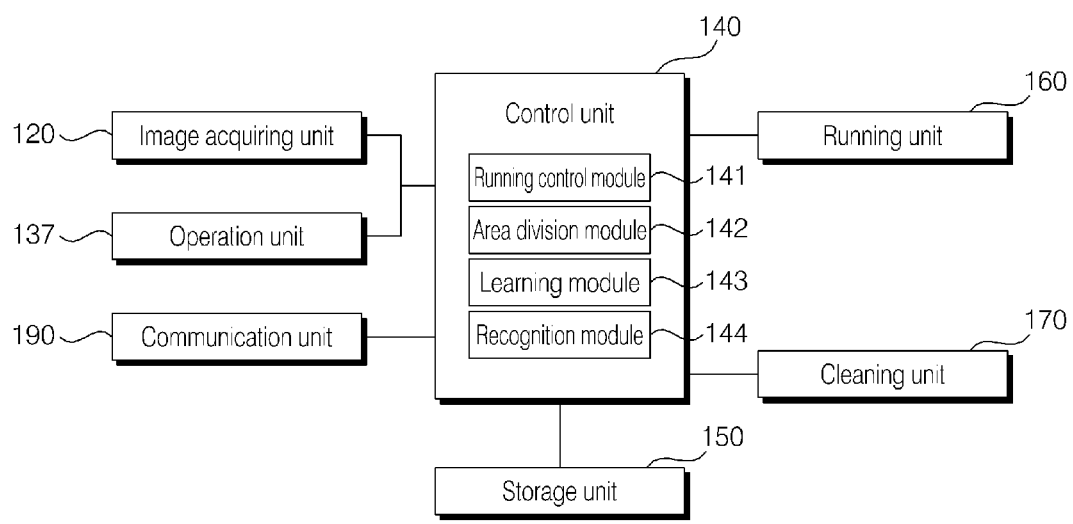
FIG. 5 is a block diagram illustrating a control relationship between main constituent elements of the moving robot according to an embodiment of the present invention.

FIG. 5 is a block diagram illustrating a control relationship between main constituent elements of the moving robot according to an embodiment of the present invention.

Referring to FIG. 5, the moving robot 100 includes a control unit 140 configured to process and determine various information including recognizing a current position, a storage unit 150 configured to store various data, a running unit 160, and a cleaning unit 170. The control unit 140 may be implemented as one or more processors, or may be implemented as a hardware device.

The moving robot 100 may further include a communication unit 190 configured to transmit/receive data.

The moving robot 100 may receive commands with respect to a communication operation through a remote controller (not shown) or a terminal (not shown). The terminal include an application for controlling the moving robot 100, may display a map with respect to a running area to be cleaned by the moving robot 100, and may designate an area to be cleaned on a specific area on the map.

For example, the terminal may include a remote controller, a PDA, a laptop, a tablet PC, and a smart phone on which the application is installed.

The terminal may communicate with the moving robot 100 to receive and display the map and to display a current position of the moving robot 100 on the map. Further, the terminal updates and displays a position of the moving robot 100 according to running thereof.

The control unit 140 controls the image acquiring unit 120, the operation unit 137, the running unit 160, and the cleaning unit 170 configuring the moving robot 100 to control an overall operation of the moving robot 100.

The storage unit 150 records various information necessary to control the moving robot 100 and may include a volatile or non-volatile recording medium. The recording medium stores data readable by a micro-processor and may include a hard disk drive (HDD), a solid state disk (SSD), a silicon disk drive (SDD), Read-Only Memory (ROM), Random Access Memory (RAM), CD-ROM, magnetic tapes, floppy disk, and optical data storage devices.

The storage unit 150 may store a map with respect to the running area. Further, the storage unit 150 stores information on an obstacle to be detected during running, and data set for a position of a charging station or to search the charging station. In this case, the moving robot 100 may learn to create the map stored in the storage unit. In some cases, the map may be input by a terminal capable of exchanging information with the moving robot 100 through wired or wireless communication. Positions of rooms in the running area may be display by areas in the map. Further, a current position of the moving robot 100 may be display on the map. A current position of the moving robot 100 on the map may be updated during a running process. The terminal store the same map as the map stored in the storage unit 150.

The control unit 140 absorbs dust or foreign materials around the moving robot 100 to perform cleaning by controlling the cleaning unit 170 during running. The cleaning unit 170 operates a brush to make the dust or the foreign materials around the moving robot 100 an easy absorbing state, and operates the suction device to absorb the dust or the foreign materials.

The control unit 140 may instruct cleaning with respect to one of a plurality of areas and moves to an area designated by a running unit to perform cleaning. In this case, the control unit 140 may control the cleaning unit to perform the cleaning while moving by the running unit 160.

The control unit 140 checks a charging capacity of a battery to determine a return time to the charging station 200. If the charging capacity reaches a predetermined value, the control unit 140 stops a performing operation to start searching the charging station to return the charging station. The control unit 140 may output a notice with respect to the charging capacity of the battery and a notice with respect to return of the charging station.

The control unit 140 designates one area based on the stored map to start searching the charging station. In this case, the control unit 140 configures a search position to search the charging station based on a position of an obstacle and a form of an area according thereto on the basis of a stored map. The control unit 140 may set a center of an area as a search position or may set a plurality of points as a search position, and may set the search position as a moving path to search the charging station while moving.

The control unit 140 sets different search positions in an area divided into a plurality of small areas by the obstacle. Further, the control unit 140 may differently set a charging station search mode according to presence of a map or whether to allow confirmation of a current position based on the map.

The control unit 140 configures a moving path connecting the search position after setting the search position to control the running unit 160.

The control unit 140 controls the running unit 160 to move to a designated area to start searching the charging station. The control unit 140 may set so that the moving robot searches the charging station from a current area or an approximate area of the moving robot. When a charging station is not found from one area, the control unit 140 controls the running unit 160 to move to another approximate area to continue searching the charging station.

In addition, the control unit 140 may set so that the running unit 160 moves to a separately designated area to search the charging station. In some cases, when a position of the charging station is stored in the map, the control unit 140 preferentially searches a corresponding area of the charging station.

If the control unit 140 receives a return signal from the charging station 200, the control unit 140 determines a position of the charging station and controls the running unit 160 so that the moving robot approaches and docks the charging station.

If the charging station is detected through the return signal of the charging station 200, the control unit 140 may store a position of the charging station on a map based on a current position of the moving robot 100.

The control unit 140 includes a running control module 141, an area division module 142, a learning module 143, and a recognition module 144.

The running control module 141 controls running of the moving robot 100 and controls driving of the running unit 160 according to running setting. Moreover, the running control module 141 may recognize a moving path of the moving robot 100 based on an operation of the running unit 160. For example, the running control module 141 may recognize current or past moving speed, and a run distance of the moving robot 100 based on rotation speed of a driving wheel 136. The running control module 141 may further recognize a current or past direction change procedure according to rotation directions of a left driving wheel 136(L) and a right driving wheel 136(R). Based on the recognized running information of the moving robot 100, a position of the moving robot 100 may be updated on a map.

The area division module 142 may divide a running area into a plurality of areas according to a predetermined reference. The running area may be defined as a range by summing areas of all planes in which running is experienced and an area of a current running plane. The area division module 142 may divide the running area into a plurality of small areas and the small areas may be divided based on each room in the running area. In addition, the area division module 142 may divide the running area into a plurality of separated large areas according to running ability. For example, two indoor spaces which are completely separated on the same line may be divided into two large areas. As another example, the large area may be divided based on each layer in the running area even in the same indoor space.

The learning module 143 may create a map of the running area. Further, the learning module 143 processes an image in each position acquired through the image acquiring unit 120 to recognize a position of the whole area in connection with a map.

The recognition module 144 estimates and recognizes a current position. The recognition module 144 may estimate and recognize a current position even when a position of the moving robot 100 is suddenly changed by recognizing the current position in connection with the learning module 143 using image information of the image acquiring unit 120.

The moving robot 100 may recognize a position during continuous running through the area division module 142, and may learn a map to estimate a current position through the learning module 143 and the recognition module 144 without the area division module 142.

While the moving robot 100 runs, the image acquiring unit 120 acquires images around the moving robot 100. Hereinafter, an image acquired by the image acquiring unit 120 is defined as 'acquisition image'. The acquisition image includes various features such as lighting devices located at a ceiling including edges, corners, blob, and ridge.

The learning module 143 detects features from the acquisition images, respectively. Various feature detection methods of detecting features from an image in a computer vision technology field are well known. Various feature detectors suitable to detect features are known. For example, the various feature detectors include a Canny detector, a Sobel detector, a Harris & Stephens/Plessey detector, a SUSAN detector, a Shi & Tomasi detector, a Level curve curvature detector, a FAST detector, a Laplacian of Gaussian, a Difference of Gaussians, Determinant of Hessian, MSER, PCBR, Grey-level blobs detector.

The learning module 143 calculates a descriptor based on each feature point. The learning module 143 may convert a feature point into a descriptor using a Scale Invariant Feature Transform (SIFT) in order to detect features. The descriptor may be denoted as n-dimensional vectors.

The SIFT may detect invariant feature with respect to a scale, rotation, and brightness change of a shooting target to detect an invariant (that is, rotation-invariant) feature although the same area is shot by changing a posture of the moving robot 100. The present invention is not limited thereto. Various other schemes (e.g., HOG: Histogram of Oriented Gradient, Haar feature, Fems, LBP: Local Binary Pattern, MCT: Modified Census Transform) are applicable.

The learning module 143 may classify at least one descriptor every an acquisition image into a plurality of groups according to a predetermined lower classification rule based on descriptor information acquired through an acquisition image of each position, and may convert descriptors included in the same group into lower representative descriptors respectively according to a predetermined lower representative rule.

As another example, the learning module 143 may classify all descriptors collected from acquisition images in a predetermined area such as a room into a plurality of groups according to the predetermined lower classification rule to convert descriptors included in the same group into lower representative descriptors respectively according to the predetermined lower representative rule.

The learning module 143 may obtain feature distribution of each position through the above procedure. The feature distribution of each position may be expressed as histogram or n dimensional vectors. As another example, the learning module 143 may estimate an unknown current position based on a descriptor calculated from each feature point without the predetermined lower classification rule and the predetermined lower representative rule.

Further, when a current position of the moving robot 100 becomes an unknown state due to a reason such as position jump, the learning module 143 may estimate a current position based on data such as a stored descriptor or a lower representative descriptor.

The moving robot 100 acquires an acquisition image through an image acquiring unit 120 in an unknown current position. Various features such as lighting devices located at a ceiling including edges, corners, blob, and ridge through an image are confirmed.

The recognition module 144 detects features from the acquisition image. A detailed description of various feature detection methods of detecting features from an image in a computer vision technology field and various feature detectors suitable to detect the above features was illustrated above.

The recognition module 144 calculates a recognition descriptor through a recognition descriptor calculating step S31 based on each recognition feature point. In this case, the recognition feature point and a recognition descriptor are for the purpose of describing a procedure performed by the recognition module 144, and are for the purpose of separating from a procedure performed by the learning module 143. However, features of an outside of the moving robot 100 are defined as different terms only.

The recognition module 144 may convert a recognition feature point into a recognition descriptor using a Scale Invariant Feature Transform (SIFT) scheme in order to detect features. The recognition descriptor may be expressed as n dimensional vectors.

As described above, the SIFT is an image recognition scheme which selects a feature point easy to identify such as a corner point from an acquisition image, and obtain rapid change degree with respect to each direction as n dimensional vectors representing a numeral with respect to each dimension with respect to a distribution feature of a brightness gradient of pixels (direction of brightness change and rapid change degree) included in a predetermined area around each feature point.

The recognition module 144 converts position information being a comparison target (e.g., feature distribution of each position) and comparable information (lower recognition feature distribution) according to a predetermined lower conversion rule based on at least one recognition descriptor information obtained from an acquisition image of an known current position.

Each similarity may be calculated by comparing each position feature distribution with each recognition feature distribution according to a predetermined lower comparison rule. Similarity (probability) by positions corresponding to each position is calculated, and a position in which the greatest probability is calculated may be determined as a current position.

As described above, the control unit 140 may divide a running area to create a map including a plurality of areas or may recognize a current position of the body 110 based on the stored map. If the map is created, the control unit 140 transmits the created map to an external terminal through the communication unit 190. As described above, further, if the map is received from the external terminal, the control unit 140 may store the map in a storage unit.

Moreover, when the map is updated during running, the control unit 140 transmits the updated information to the external terminal to make a map stored in the external terminal to be the same as a map stored in the moving robot 100.

By maintaining the map stored in the external terminal to be the same as the map stored in the moving robot 100, the moving robot 100 may clean a designated area with respect to a cleaning command from the external terminal. In addition, the above is for the purpose of display a current position of the moving robot 100 on the external terminal.

In this case, the map divides a cleaning area into a plurality of areas, includes a connection path connecting a plurality of areas to each other and includes information on obstacles in the area. As described above, the cleaning area is divided into a small area and a large area by the area division module 142.

If a cleaning command is input to the control unit 140, the control unit 140 determines whether a current position of the moving robot 100 is the same as a position on the map. The cleaning command may be input from a remote controller, an operation unit, or an external terminal.

When the current position of the moving robot 100 is different from the position on the map, or the current position of the moving robot 100 cannot be confirmed, the control unit 140 recognizes a current position to return the current position of the moving robot 100 and controls the running unit to move the moving robot 100 to a designated area based on the current position.

When the current position of the moving robot 100 is different from the position on the map, or the current position of the moving robot 100 cannot be confirmed, the recognition module 144 may analyze an acquisition image input from the image acquiring unit 120 to estimate the current position based on the map. As described above, the area division module 142 or the learning module 143 may further recognize the current position.

After restoring the current position of the moving robot 100 by recognizing the position, the running control module 141 calculates a moving path from a current position to a designated area and controls the running unit 160 to move the moving robot 100 to the designated area.

When at least one of a plurality of areas is selected from the external terminal, the running control module 141 sets the selected area as the designated area to calculate the moving path. The running control module 141 performs cleaning after moving to the designated area.

Meanwhile, when a plurality of areas are selected as the designated area, the running control module 141 determines whether a preference area is set from a plurality of areas or a cleaning order with respect to a plurality of selected designated areas is set, and then the running control module 141 moves to the designated area to perform cleaning.

When one of a plurality of designated areas is set as a preference area, the running control module 141 moves to the preference area of a plurality of designated areas to firstly perform the preference area and then moves to remaining designated areas to clean. Further, when the cleaning order with respect to the designated areas is set, the running control module 141 sequentially move to the designated areas according to the designated cleaning order to perform cleaning.

Further, when an optional area is newly set regardless of division of a plurality of areas on the map, the running control module 141 moves to the set designated area to perform cleaning.

If cleaning with respect to the set designated area is terminated, the control unit 140 stores a cleaning record in a storage unit 150.

In addition, the control unit 140 transmits an operation state or a cleaning state of the moving robot 100 to the external terminal 50 at a predetermined time period. Accordingly, the terminal display a position of the moving robot 100 on a screen of an executed application together with the map based on received data and outputs information on the cleaning state.

Moreover, if a charging station 200 is detected through a return signal of the charging station 200, the control unit 140 recognizes a current position of the moving robot 100 through a learning unit and a recognition unit, and calculates and stores a position of the charging station 200 based on the current position of the moving robot 100. In addition, the control unit 140 may set the position of the charging state to be displayed on the map.

Figure 6:
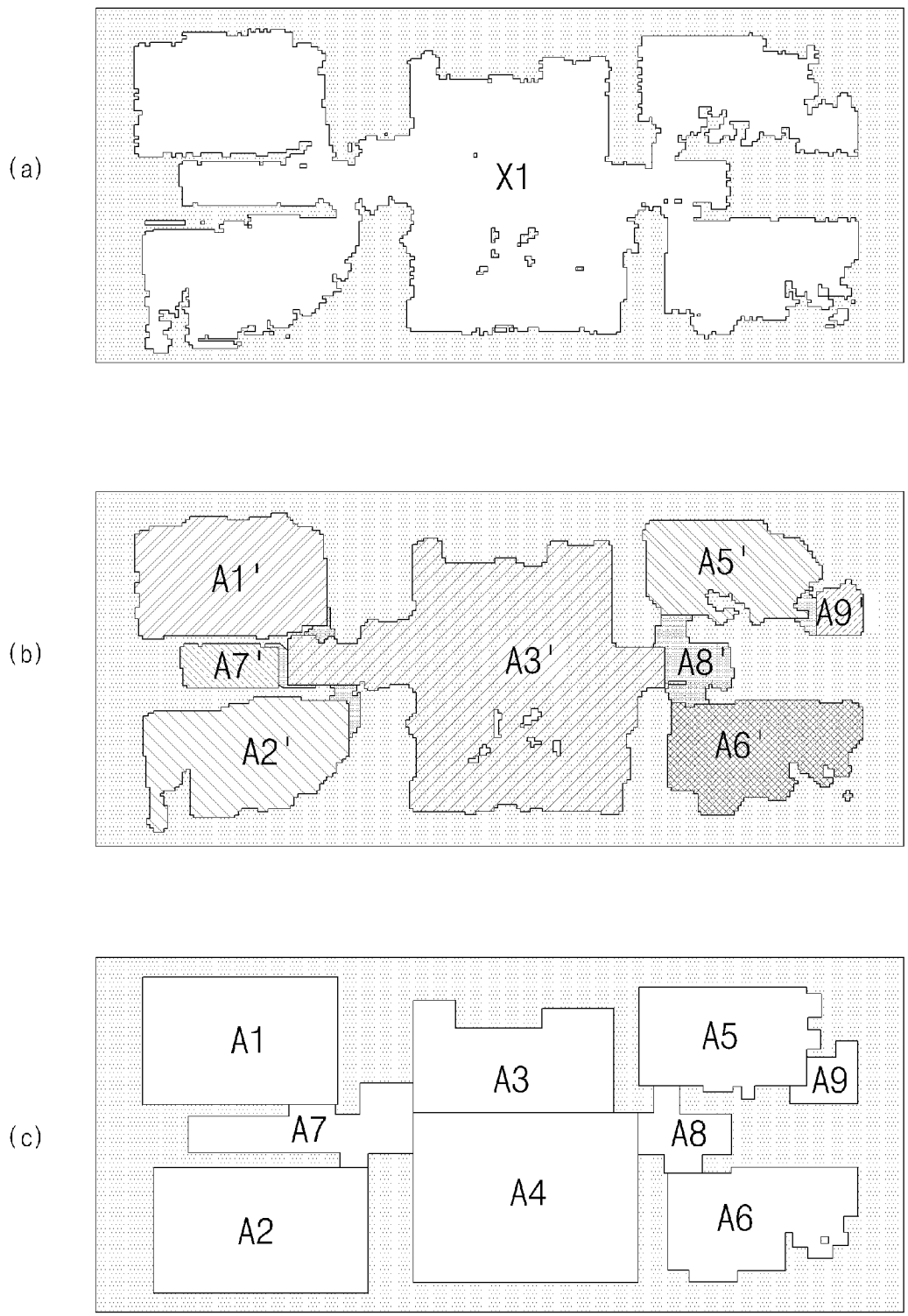
FIG. 6 is a diagram illustrating an example of an area division of a moving robot and composing a map according thereto according to the present invention.

FIG. 6 is a diagram illustrating an example of an area division of a moving robot and composing a map according thereto according to the present invention.

As described above, FIG. 6(a), when there is no stored map, the moving robot 100 may run a running area X1 through wall following to create a map.

As shown in FIG. 6(b), the area division module 142 divides the running area X1 into a plurality of areas A1' to A9' to create the map. The created map is stored in the storage unit 150 and is transmitted to an external terminal through a communication unit 190. As described above, the area division module 142 divides the running area X1 into a small area and a large area to create a corresponding map.

The terminal executes an application to display the received map on a screen. In this case, a plurality of divided areas A1 to A9 is differently displayed. A plurality of divided areas A1 to A9 is displayed with different colors or with different names.

Although the moving robot and the terminal store the same map, a map simplifying an area is displayed so that a user may easily recognize the area as shown in FIG. 6(c), and the moving robot 100 performs running and cleaning based on a map as shown in FIG. 6(b) including information on an obstacle. The obstacle may be displayed in FIG. 6(c).

If a cleaning command is input, the moving robot 100 determines a current position based on the stored map. When the current position is the same as a position on the map, the moving robot 100 performs cleaning with respect to a designated area. When the current position is different from the position on the map, the moving robot 100 recognizes the current position and returns to perform cleaning. Accordingly, although the moving robot 100 is located at one of a plurality of areas A1 to A9, the moving robot 100 determines a current position and moves to a designated area to perform cleaning.

As shown, a remote controller or a terminal may select at least one from a plurality of areas A1 to A9 to input a cleaning command to the moving robot 100. Further, the moving robot 100 may set a part of one area as a cleaning area through the remote controller or the terminal or may set a plurality of areas as the cleaning area without dividing the plurality of areas through touch or drag.

When a cleaning command is input with respect to a plurality of areas, one area is set as a preference area or the preference area starts and the moving robot moves to an approximate area to perform cleaning or a cleaning order may be set. When the cleaning order is set to a plurality of designated areas, the moving robot 100 moves in the designated order to perform cleaning. When a separate order is not designated with respect to a plurality of cleaning areas, the moving robot 100 moves from a current position to an area close thereto to perform cleaning.

Figure 7:
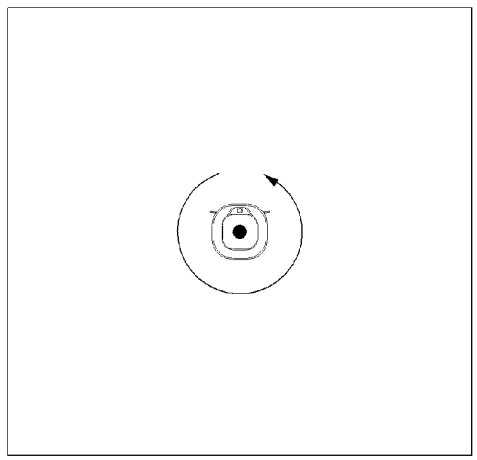
FIG. 7 is a diagram illustrating an example of searching a charging station in an area of the moving robot according to an embodiment of the present invention.
Figure 7:
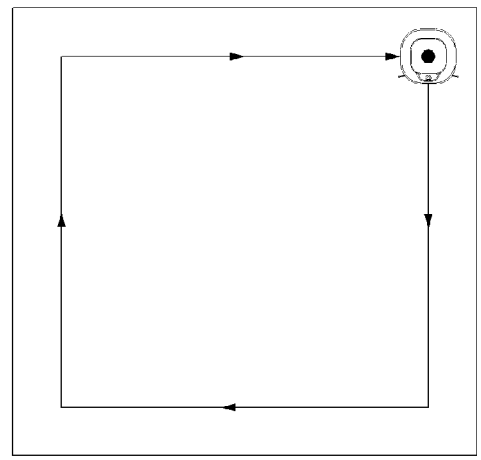
Figure 7:
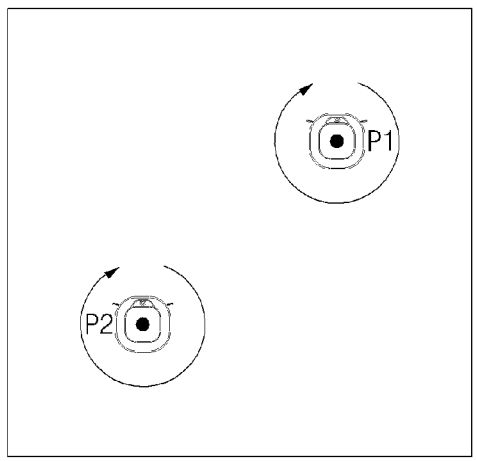
Figure 7:
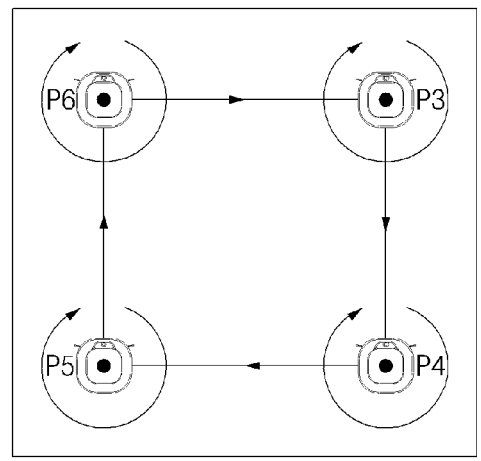

FIG. 7 is a diagram illustrating an example of searching a charging station in an area of the moving robot according to an embodiment of the present invention.

As shown in FIG. 7, when charging is needed during cleaning or running, the moving robot 100 starts searching a charging station.

The moving robot 100 sets a search mode according to a form of an area and sets a search position by search modes to search the charging station. The moving robot 100 may use a central point of an area or set a plurality of search positions. Further, the moving robot 100 may set a running path of a profile shape of an area to search the charging station. In addition, the moving robot 100 may run a line extracted along a shape of an area to search the charging station.

As shown in FIG. 7(a), the moving robot 100 moves to a center of an area, and rotates at 360° in the center of the area to detect a return signal of the charging station 200. The moving robot 100 sets the center of the area as a search position to detect the charging station.

In this case, the moving robot 100 performs a rotation operation at the center of the area in a case of an open space to detect the charging station. Although the obstacle is included in the area, when a blind spot is generated due to the obstacle, the moving robot 100 rotates in the center of the area to detect the charging station. In this case, the open space is a space in which a blind spot with respect to a return signal of the charging station is not generated due to the obstacle as an area having a predetermined size or larger which is not interfered from the obstacle. For example, when the area is divided by a partition or furniture, the divided area is not determined as an open space.

However, since the area has a predetermined size or larger, and it is difficult to immediately search a very wide area, the area may be limited to an area having a predetermined size or smaller. A size of an area being a determination reference may be changed according to a reach distance of a return signal of the charging station or a detection distance of the moving robot.

Further, as shown in FIG. 7(*b*), the moving robot 100 may be spaced apart from an outline of an area by a predetermined distance and may move corresponding to a shape of the outline to detect the return signal of the charging station. The moving robot 100 sets a path moving along an outline of an area as a search position to detect the charging station.

Since the moving robot 100 moves along an outline of the area separately from wall following, the moving robot 100 does not move along a wall close to a wall surface but moves spaced apart from the wall by a predetermined distance without approaching the wall to search the charging station. The moving robot moves while maintaining a distance of a degree capable of detecting a return signal of the charging station. The moving robot 100 may move along an outline of the area while ignoring change of an outline on a wall due to a small obstacle.

As shown in FIG. 7(*c*), the moving robot 100 may set a plurality of search positions in the area to search the charging station 200.

The moving robot 100 may set a position input from a terminal or a remote controller and may set a search position based on a form of a space. In addition, the moving robot 100 may set a plurality of search positions according to a detection range.

For example, when a size of an area to be searched is large or a return signal is detected from a center of the area, if there is a blind spot which cannot be detected, a plurality of positions are set as a search position with respect to a case where an area is divided into a plurality of small areas by an obstacle in the area.

The moving robot 100 moves to a search position and rotates at 360° in the search position to detect a return signal of the charging station. When a plurality of search positions are set, after the charging station is detected from one search position, the moving robot 100 moves to a next search position to detect the charging station.

For example, the moving robot 100 determines whether the charging station is located in the area to determine a position of the charging station by detecting a return signal of the charging station by setting a first point P1 and a second point P2 as a search position.

As shown in FIG. 7(*d*), the moving robot 100 may analyze a form of the area to create a line and set the created line as a search position.

The moving robot 100 may set a line created along a form of the area and move to a designated moving path to search the charging station.

Further, the moving robot 100 may extract a plurality of points from a line created along the form of the area to set the search position. The moving robot 100 may set a part or all of corners, a plurality of branch points, and nodes on the line as the search position.

For example, the moving robot 100 creates a square line to set third to sixth points P3 to P6 of a corner on the line as search positions, respectively with respect to an area of a square shape.

Moreover, the moving robot 100 may set the line as a moving path with respect to a search position set through the line or set the shortest distance connecting search positions to each other to search the charging station. The moving robot 100 performs a rotation operation at the search position and moves to a next search position to search the charging station 200.

Figure 8:
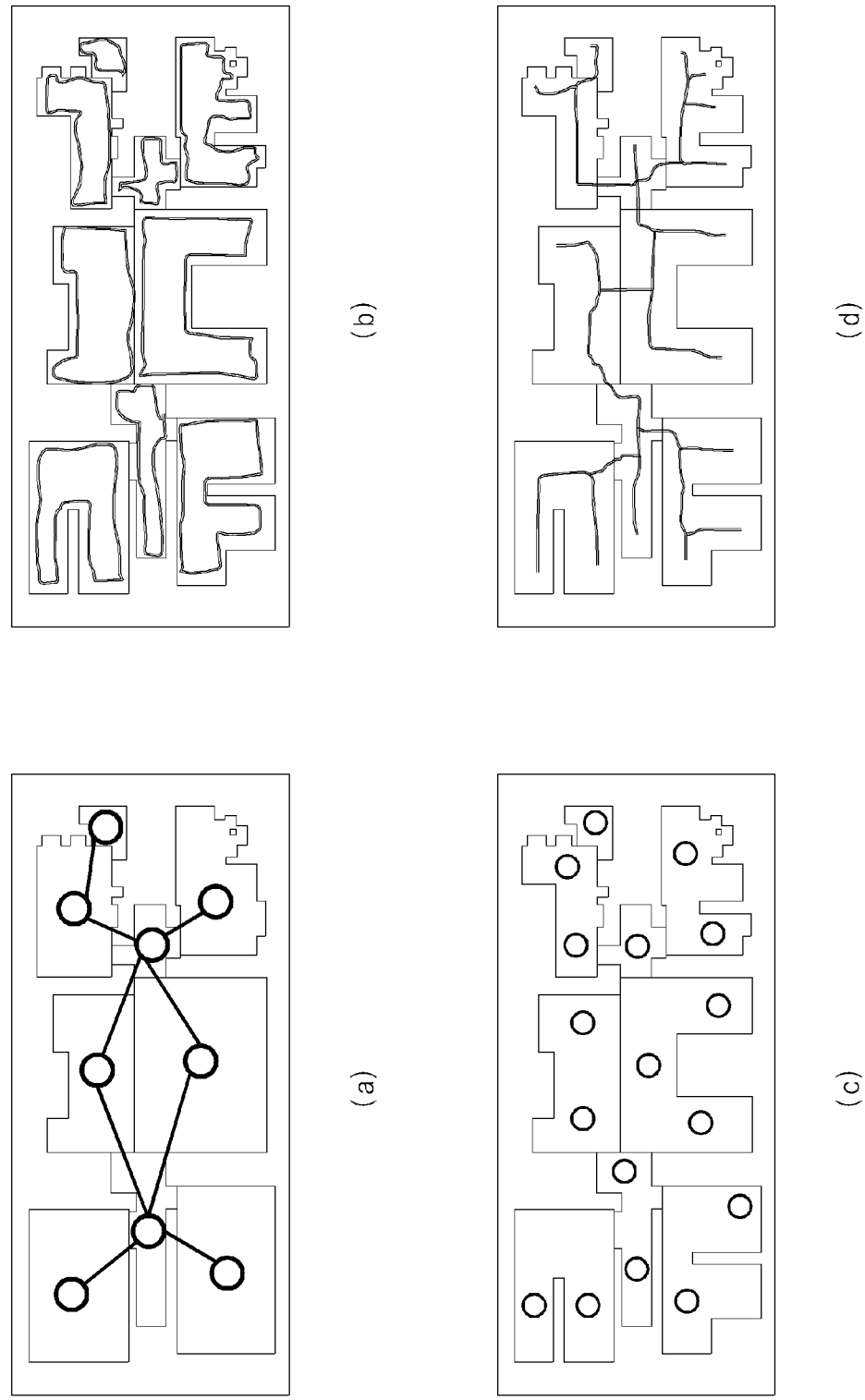
FIG. 8 is a reference diagram illustrating a charging station search mode by areas according to an example of FIG. 7.

FIG. 8 is a reference diagram illustrating a charging station search mode by areas according to an example of FIG. 7.

As shown in FIG. 8, the moving robot 100 searches the charging station based on a method of configuring a search position with respect to a plurality of areas.

As shown in FIG. 8(*a*), the moving robot 100 sets a center of each area with a plurality of areas as the search position, and moves to a center of each area and rotates one round to search the charging station. When the charging station is not detected, the moving robot 100 moves to a next area to detect the charging station.

Since the moving robot 100 moves to a center of the area, the moving robot 100 may determine an area corresponding to a hallway or a passage of a plurality of areas as a separate small area to search the charging station.

However, the moving robot 100 searches the charging station from a center of the area with respect to an open space as shown. Due to an obstacle in the area, a blind spot beyond a detection range of a return signal of the moving robot 100 is formed or a size of the area is larger than the detection range of the moving robot, another method of searching charging station illustrated in FIG. 7 may be used or in parallel.

As shown in FIG. 8(*b*), the moving robot 100 sets a moving path in an area based on an outline of each area to run and search a charging station. If searching one area is terminated, the moving robot 100 moves to another approximate area and sets a moving path in the area based on an outline of a corresponding area to run and search the charging station. The moving robot does not approach a wall and runs while being spaced apart from a wall by a predetermined distance based on a detection range.

In this case, a moving distance may be increased as compared with a case where the moving robot 100 searches the charging station at a center of an area as shown in FIG. 8(*a*). However, the moving robot may search the charging station every corner with respect to each area.

As shown in FIG. 8(*c*), the moving robot 100 sets a plurality of search positions in each area and moves to search positions by areas to detect the charging station.

In this case, the search position may be a position input through a remote controller or a terminal and may be set based on a form of an area. For example, in FIG. 7(*d*), when the form of the area is made as a line, a plurality of points on the map, for example, corners, branch points, and nodes on the lines may be extracted and be set as a search position.

Further, when a blind spot which cannot be detected is generated from the center of the area in FIG. 8(*a*), the moving robot 100 searches the charging station with respect to a plurality of areas by setting a plurality of search positions by taking into consideration a detection range.

As shown in FIG. 8(d), the moving robot 100 makes a form of the area as a line, and sets the line as a search position and a moving path to search the charging station during running a moving path.

Since the moving robot 100 creates the line based on the form of the area, a problem with respect to a blind spot may be solved according to the above detection range, and a running distance may be reduced as compared with a case of moving in the form of an outline.

As described above, the moving robot 100 searches the charging station in a plurality of methods, and may search different charging stations with respect to each area based on a form of an area by a combination of the above methods.

When a charging station is searched from a plurality of areas, a charging station in a center is searched with respect to an open space having a predetermined size or smaller based on a size of a form of each area. When an obstacle is included in an area exceeding a predetermined size or in the area, a plurality of search points are set or is made as a line according to a form of a space and a search position is set so that a charging station may be searched.

Figure 9:
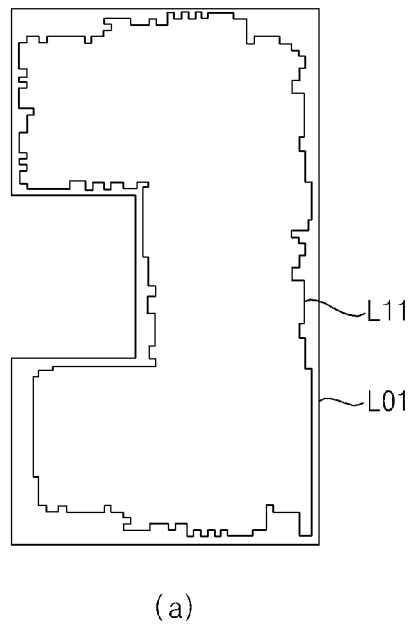
FIG. 9 is a reference diagram illustrating a method of configuring a search position in an area of the moving robot according to an embodiment of the present invention.
Figure 9:
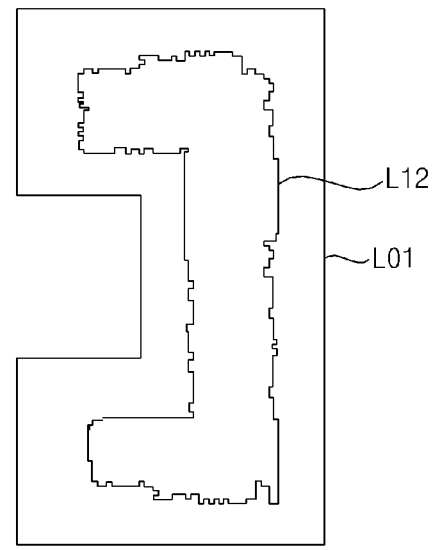
Figure 9:
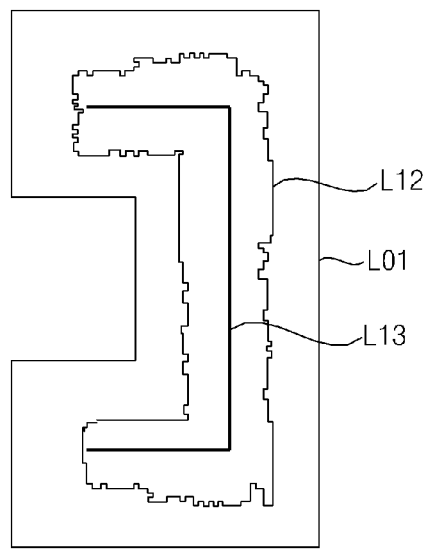
Figure 9:
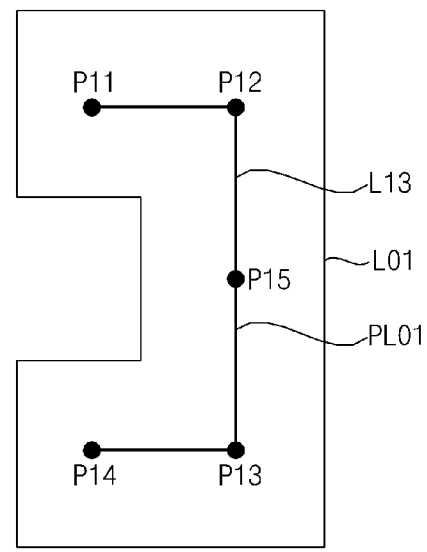

FIG. 9 is a reference diagram illustrating a method of configuring a search position in an area of the moving robot according to an embodiment of the present invention.

As shown in FIG. 9, a search position is set corresponding to a form of an area to be searched. As shown in FIG. 9(a), when a charging station is searched from a first area L01, the moving robot analyzes a form of an area based on a stored map L11 with respect to a first area.

The moving robot 100 analyzes a form of the first area L01 based on a map and performs a session operation to extract a line with respect to a form of an area.

The session operation extracts information on a line from a thick drawing, and extracts line information according to a form of a drawing by narrowing a thickness of the drawing less than a predetermined thickness.

The moving robot 100 repeats to narrow a thickness based on a map L11 with respect to an area as shown in FIG. 9(b). If a thickness of a map with respect to an area is reduced (L12) and a thickness is reduced less than a predetermined value to be changed to a line shape in a drawing form, the moving robot 100 extracts a first line L13 as shown in FIG. 9(c).

The moving robot 100 sets a search position from the extracted line L13.

The moving robot 100 may extract a plurality of nodes P11 to P15 including corners, branch points, and a node of a line center of the first line L13, and may set a plurality of nodes or a part of a plurality of nodes as a search position with respect to the first area.

The moving robot 100 moves between designated search positions regardless of a line to search a charging station by rotation in the search position. Further, the moving robot 100 moves along the first line L13 and sets the first path PL01 as a moving path, and moves along a line to search the charging station by rotation in a search position.

Moreover, the moving robot 10 may designate the extracted line L13 as a search position and set as a moving path. That is, the moving robot 100 may move along a line to search the charging station.

Setting the search position of the moving robot 100 and whether to set a line as a moving path may be changed according to input setting. In addition, as described above, the setting the search position of the moving robot 100 and whether to set a line as a moving path may be change according to a form of an area of searching the charging station. A charging station may be searched through different methods with respect to a plurality of area by a combination of a plurality of methods.

If the charging station is detected, the moving robot 100 stores a position of the charging station together with a map. In addition, since the position of the charging station may be changed, the moving robot 100 store information on the extracted line L3 and a search position together with the map.

Figure 10:
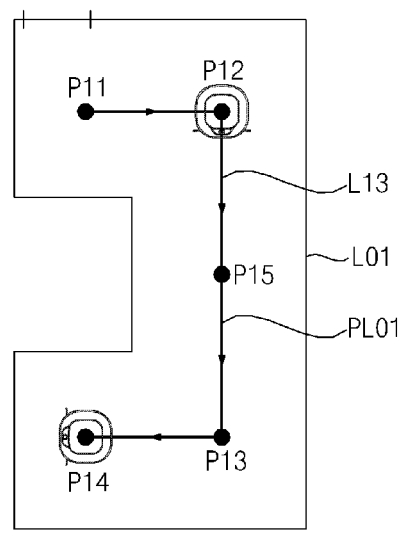
FIG. 10 is a reference diagram illustrating a method of configuring a path according to a search position of the moving robot according to an embodiment of the present invention.
Figure 10:
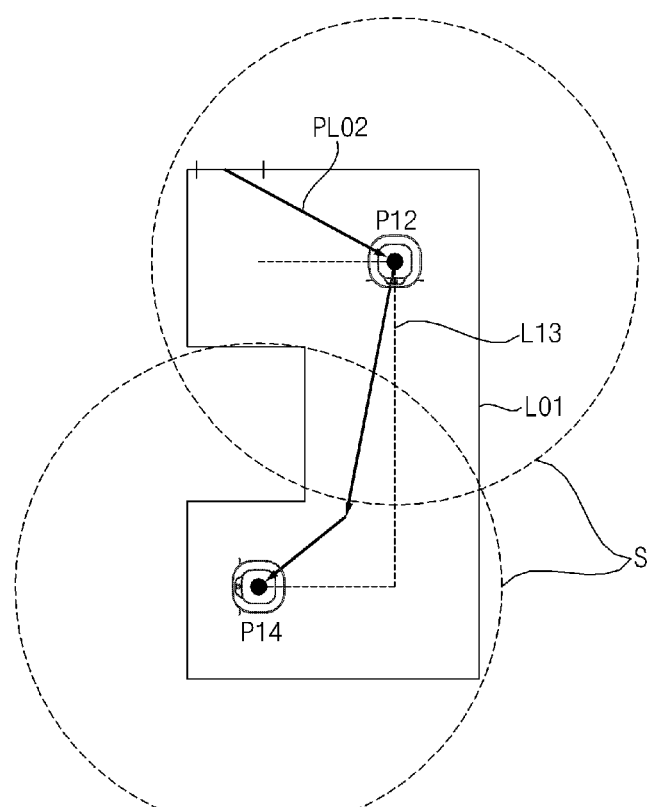

FIG. 10 is a reference diagram illustrating a method of configuring a path according to a search position of the moving robot according to an embodiment of the present invention.

As shown in FIG. 10(a), the moving robot 100 may extract a first line L13 and a plurality of nodes P11 to P15 with respect to a first area L01 to set a part of a plurality of nodes as a search position. The moving robot 100 may set a first path PL01 moving along a first line L13 as a moving path and move to search the charging station.

As shown in FIG. 10(b), the moving robot 100 set a part of a plurality of nodes P11 to P15 based on a size of an area and a detection range S for searching the charging station as a search position.

The moving robot 100 sets a search position capable of searching all of the first area L01 based on a size of the detection range S.

The moving robot 100 may set a second point or a third point being corners or a first point and a fourth point of an end node in an area from a plurality of nodes P11 to P15 as search positions, respectively. In addition, the moving robot 100 may set a new node between nodes according to a size of an area to set a search position.

For example, the moving robot 100 may set the second point P12 as a first search position and may set a fourth point P14 as a second search position in order to search an area which is not included in a second search position from the second point.

The moving robot 100 may set a first path PL01 moving along the first line L13 as a moving path. Further, as shown, the moving robot 100 may set the shortest path PL02 for connecting the first search position to the second search position as a moving path. In this case, the moving robot 100 may set a moving path based on the first path PL01 and may run only a part of the first path according to a search position.

Figure 11:
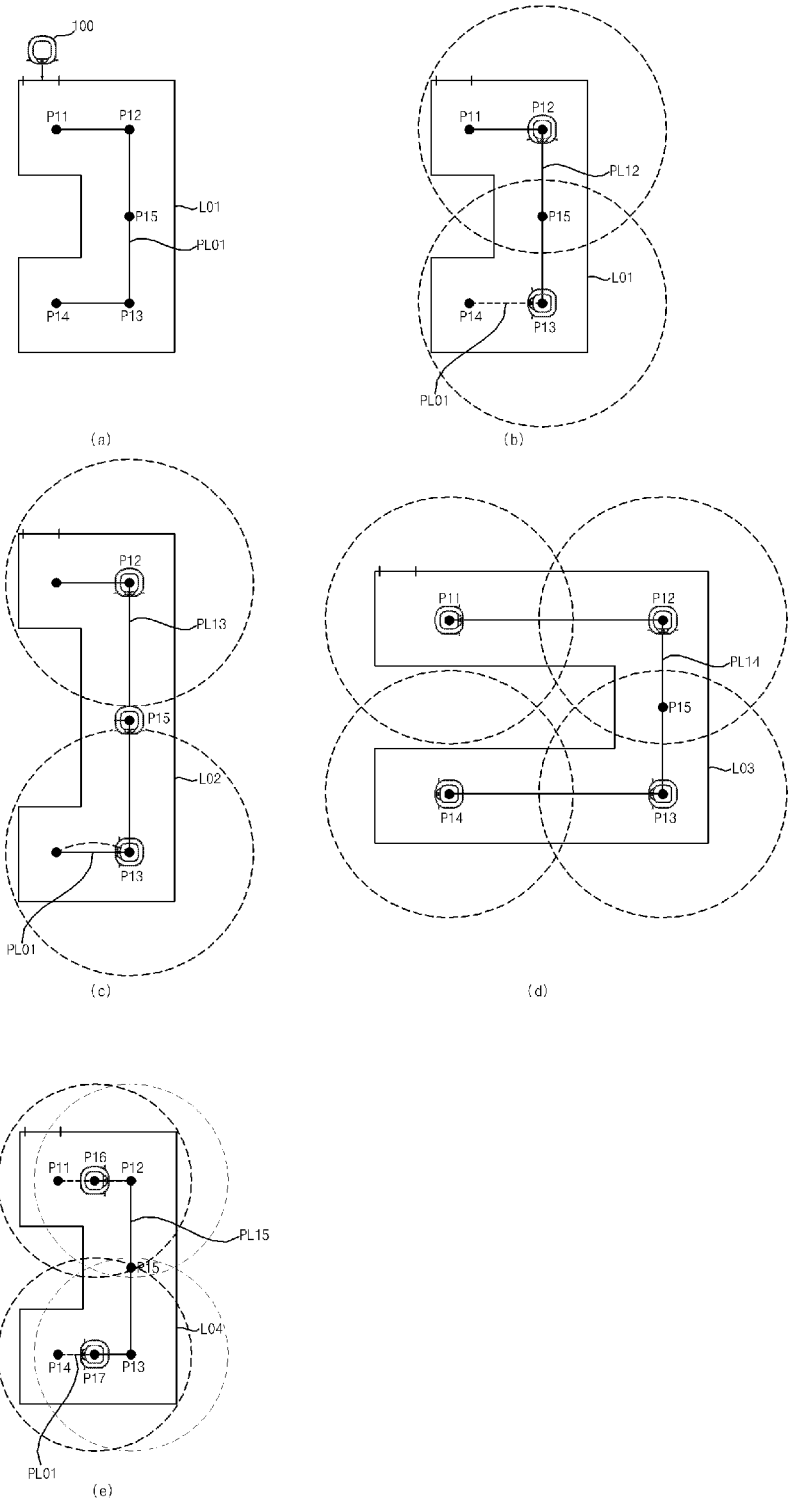
FIG. 11 is a diagram illustrating an embodiment according to a form of an area based on the method of configuring a search position shown in FIG. 9.

FIG. 11 is a diagram illustrating an embodiment according to a form of an area based on the method of configuring a search position shown in FIG. 9.

As shown in FIG. 11(a), when the moving robot 100 searches a charging station with respect to the first area L01, the moving robot 100 extracts a first line L13 through a session operation, extracts a plurality of nodes P11 to P15, and sets a part of a plurality of nodes P11 to P15 as a search position as according to a size or a form of an area and a detection range S.

Hereinafter, although moving in the first area may set the shortest path connecting a search position as a moving path, the moving robot 100 moves along a first path PL01 by way of example. However, the moving robot may set only a part of a first path as a moving path according to a search position and may move using the shortest path.

The moving robot 100 moves a designated moving path to search a charging station. As soon as the charging station is detected, the moving robot 100 moves to the charging station to attempt docking. The moving robot 100 moves in one area along a moving path. When the charging station is not detected, the moving robot 100 moves to another area to search the charging station.

Hereinafter, an example of setting a search position according a form and a size of an area will be described as follows.

As shown in FIG. 11(*b*), the moving robot 100 may set a second point P12 and a third P13 capable of searching all of the first area as a search position according to a form of an area and a size of a detection range S to search the charging station with respect to the first area.

The moving robot 100 moves along a moving path and stops at the second point P12 and the third point P13, and rotates one round to search the charging station.

In this case, since the first path PL01 is connected to a fourth point P14, but the moving robot 100 may search from the third point P13 to a fourth point, the moving robot sets the twelfth path PL12 as a moving path to move without moving to the fourth point.

As shown in FIG. 11(*c*), the moving robot 100 may further set the search position with respect to a second area L02 where a distance between the second point P12 and the third point P13 is farther than a detection range according to a form of an area and a size of a detection range S.

Since all areas cannot be detected by only searching a charging station in the second point and the third point, the moving robot 100 sets a fifth point P15 being a center point as a search point together with the second point P12 and the third point P13. Further, the moving robot 100 sets a thirteenth path PL13 between the second point and the third point as a moving path.

The moving robot 100 moves between the second point P12, the fifth point P15 and the third point P13 and rotates one round in each point to search the charging station to the third point. When the charging station is not detected, the moving robot 100 moves to another area to search the charging station.

As shown in FIG. 11(*d*), the moving robot 100 may set four points as a search position according to a detection range S with respect to a third area L03 where a distance between the first point P11 and the second point P12, and between the third point P13 and the fourth point P14 is distant.

Since the fourth point cannot be detected at the third point, a fourteenth path PL14 to the fourth point is set as a moving path to search the charging station.

The moving robot 100 moves from the first point P11 to the fourth point P14 along the fourteenth path PL14 and rotates at the range of the first P11 to the fourth point P14 to search the charging station.

Moreover, as shown in FIG. 11(*e*), a horizontal length of the fifth area L05 may be detected as a detection range S of the moving robot 100. However, when a partial area in the second point P12 and the third point P13 cannot be detected, a sixth point P16 between the first point P11 and the second point P12 and a seventh point P17 between the third point and the fourth point may be set as a search position.

The moving robot 100 sets a fifteenth path PL15 connecting the search position as a moving path to search the charging station. When the charging station is not detected, the moving robot 100 moves to a next area to detect the charging station.

Figure 12:
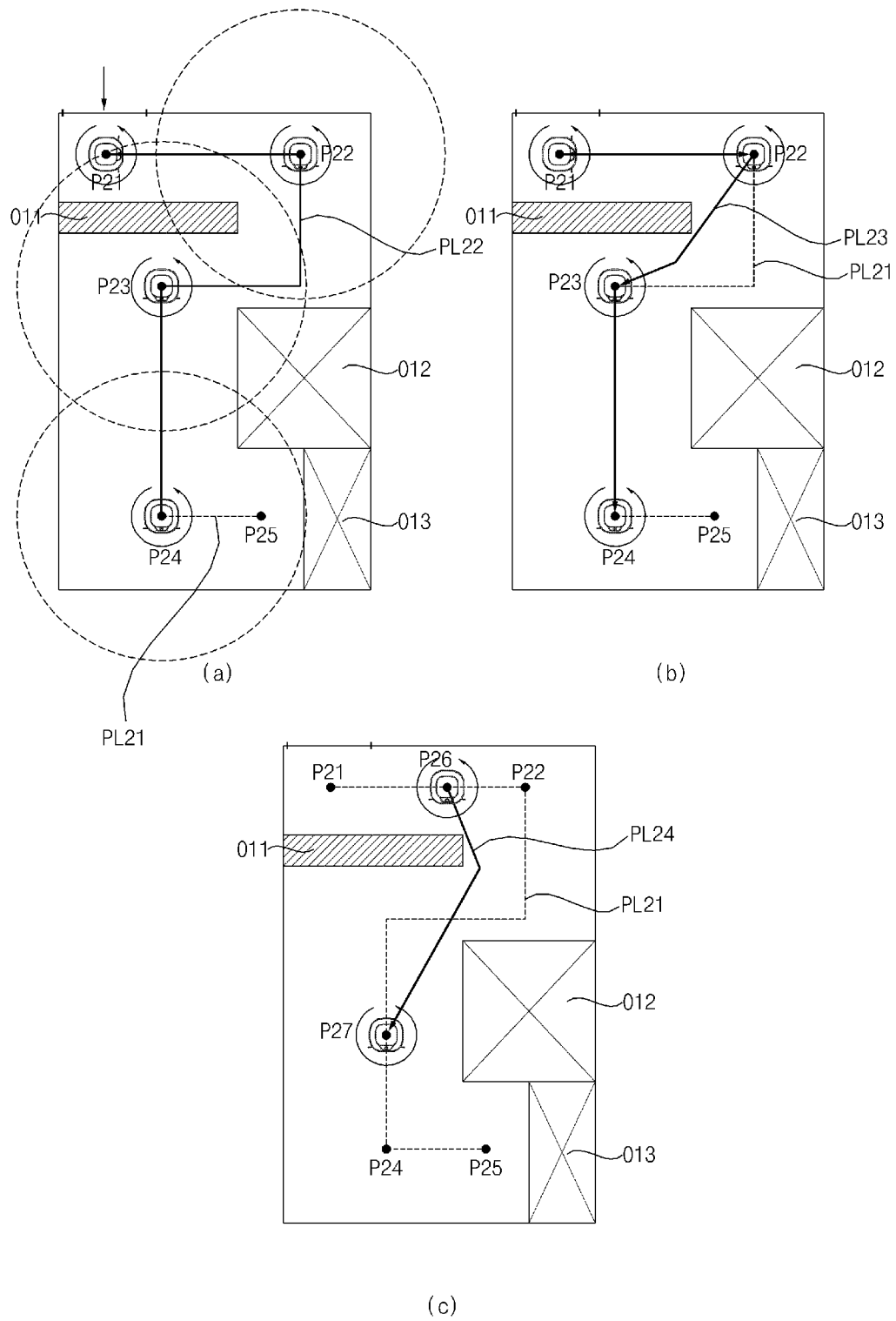
FIG. 12 is a diagram illustrating an embodiment according to a form of an area based on the method of configuring a search position shown in FIG. 10.

FIG. 12 is a diagram illustrating an embodiment according to a form of an area based on the method of configuring a search position shown in FIG. 10.

As shown in FIG. 12(*a*), when there are a plurality of obstacles O11, O12, and O13 in an area, since the area is not an open area, the moving robot 100 sets a plurality of points as a search position to search the charging station as described above.

The moving robot 100 extracts a line with respect to an area through a session operation and sets a part of a plurality of nodes as a search position to search the charging station. The moving robot 100 may set a twenty first point P21, a twenty second point P22, a twenty third point P23, and the twenty fifth point P24 as a search position according to a detection range S.

The moving robot 100 sets a twenty second path PL22 connecting the search position based on the extracted line PL21 to search the charging station. If the moving robot 100 rotates in each search position, the moving robot 100 search the charging station. When the charging station is not detected, the moving robot 100 moves to a next search position and rotates to detect the charging station.

Further, as shown in FIG. 12(*b*), the moving robot 100 sets a twenty third path PL23 being the shortest path connecting a search position as a moving path to search the charging station.

Meanwhile, as shown in FIG. 12(*c*), the moving robot 100 may set a twenty sixth point between a twenty first point and a twenty second point, and a twenty seventh point P27 between the twenty third point and the twenty fourth point as a search position, respectively, and may set the twenty fourth path PL24 connecting the search position as a moving path to search the charging station.

Figure 13:
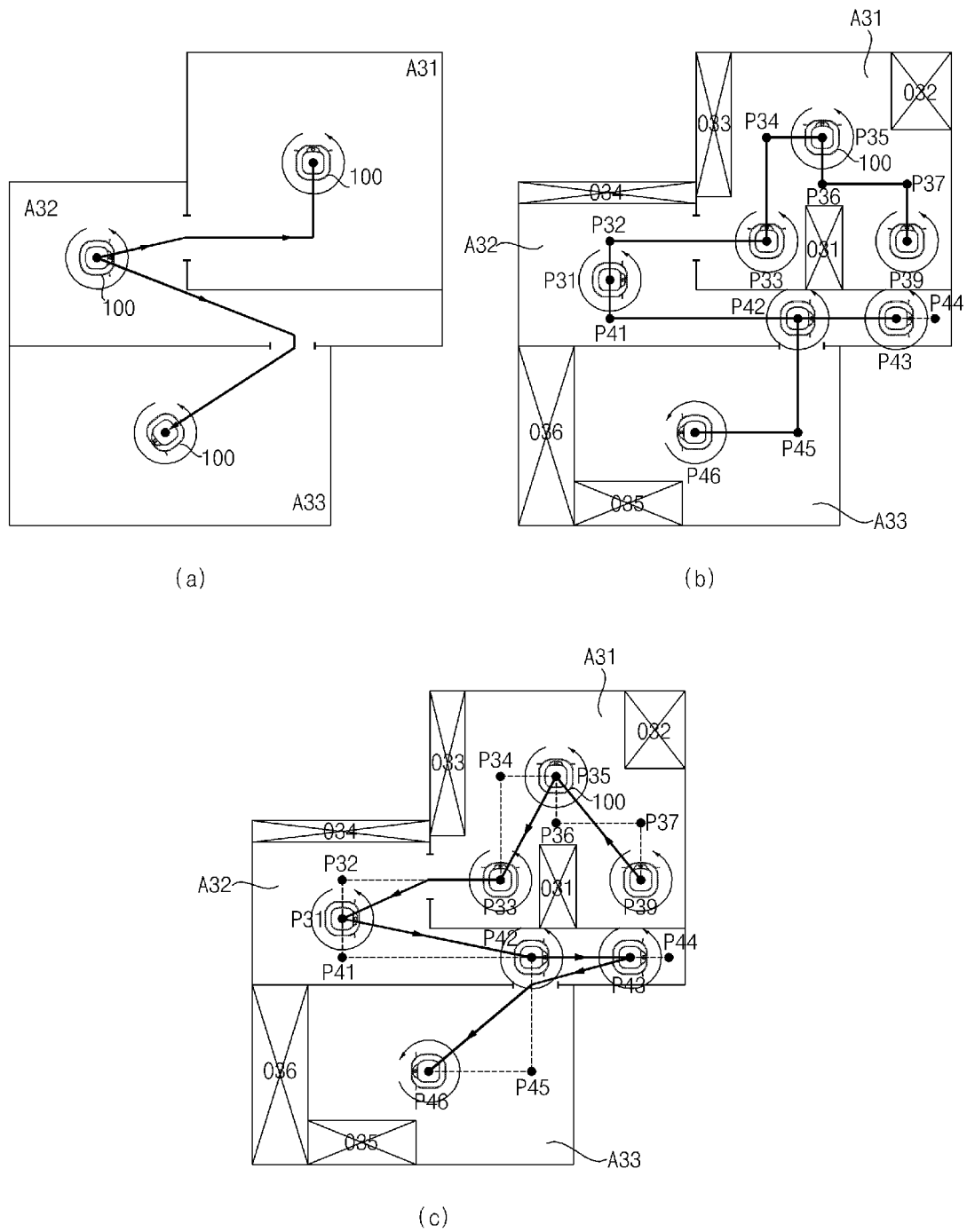
FIG. 13 is a diagram illustrating an embodiment of moving between a plurality of areas and charging station search of the moving robot according to an embodiment of the present invention.

FIG. 13 is a diagram illustrating an embodiment of moving between a plurality of areas and charging station search of the moving robot according to an embodiment of the present invention.

When a charging station is searched with respect to a plurality of areas including a thirty first area A31, a thirty second area A32, and a thirty third area A33, the moving robot 100 moves each area to search a search position and sets a moving path connecting the search position to search the charging station.

As shown in FIG. 13(*a*), when the thirty first area A31, the thirty second area A32, and the thirty third area A33 are an open area having no obstacle, the moving robot 100 sets a central point of each area as a search position and rotates at a center of the area to search the charging station.

The moving robot 100 rotates at the thirty second area A32 to search the charging station, and moves to a center of the thirty first area A31 and rotates to detect the charging station. When the charging station is not detected, the moving robot 100 may move to a center of the thirty third area A33 through the thirty second area to search the charging station.

If the charging station is detected, the moving robot 100 moves to the charging station and docks to start charging. Further, the moving robot 100 stores a position of a charging station on a map with respect to the detected charging station based on a current position of the moving robot 100.

However, when a charging station is located at an area connecting the thirty second area A32 to the thirty third area A33, the moving robot 100 cannot detect the charging station. Accordingly, the moving robot 100 may additionally sets a search position to the area connecting the thirty second area A32 to the thirty third area A33 to search the charging station.

In addition, as shown in FIG. 13(*b*), the moving robot 100 may set a plurality of points with respect to each area as a search position to search the charging station.

When a plurality of obstacles O31 to O33 are included in the thirty first area A31 and the thirty first area A31 is open, the moving robot 100 extracts the thirty third point to the thirty ninth point with respect to the thirty first area A31 as a node to set a search position according to the detection range and a form of an area.

For example, the moving robot 100 may set a thirty third point P33, a thirty fifth point P35, and a thirty ninth point P39 as a search position, and may set a moving path connecting the search position along a line. Further, since an obstacle O34 is included in the thirty second area A32 but the thirty second area A32 is open, the moving robot 100 sets the thirty first point P31 being a central point as a search position, and adds a forty second point P42 and a forty third point P43 connecting the thirty second area with a thirty third area which cannot be detected as a search position to set a moving path to the forty third point P43 as a moving path. In a case of the thirty third area A33, since obstacles O36 and O35 in an area do not hinder to detect the charging station, the area is determined as an open space so that the forty sixth point P46 being a central point is set as a search position. In some cases, when a size of the thirty third area is larger than the detection range, the search position may be additionally set.

As described above, the moving robot 100 sets a central point or a plurality of nodes as the search position according to a form of an area, and moves along a moving path formed from a line extracted by session to detect the charging station.

Meanwhile, the moving robot 100 may set the search position as described above, and may set a moving path connecting the search position as the shortest path as shown in FIG. 13(*c*). Accordingly, the moving robot 100 may connect the search position to the search position by the shortest path to set the moving path so that the charging station may be searched.

Figure 14:
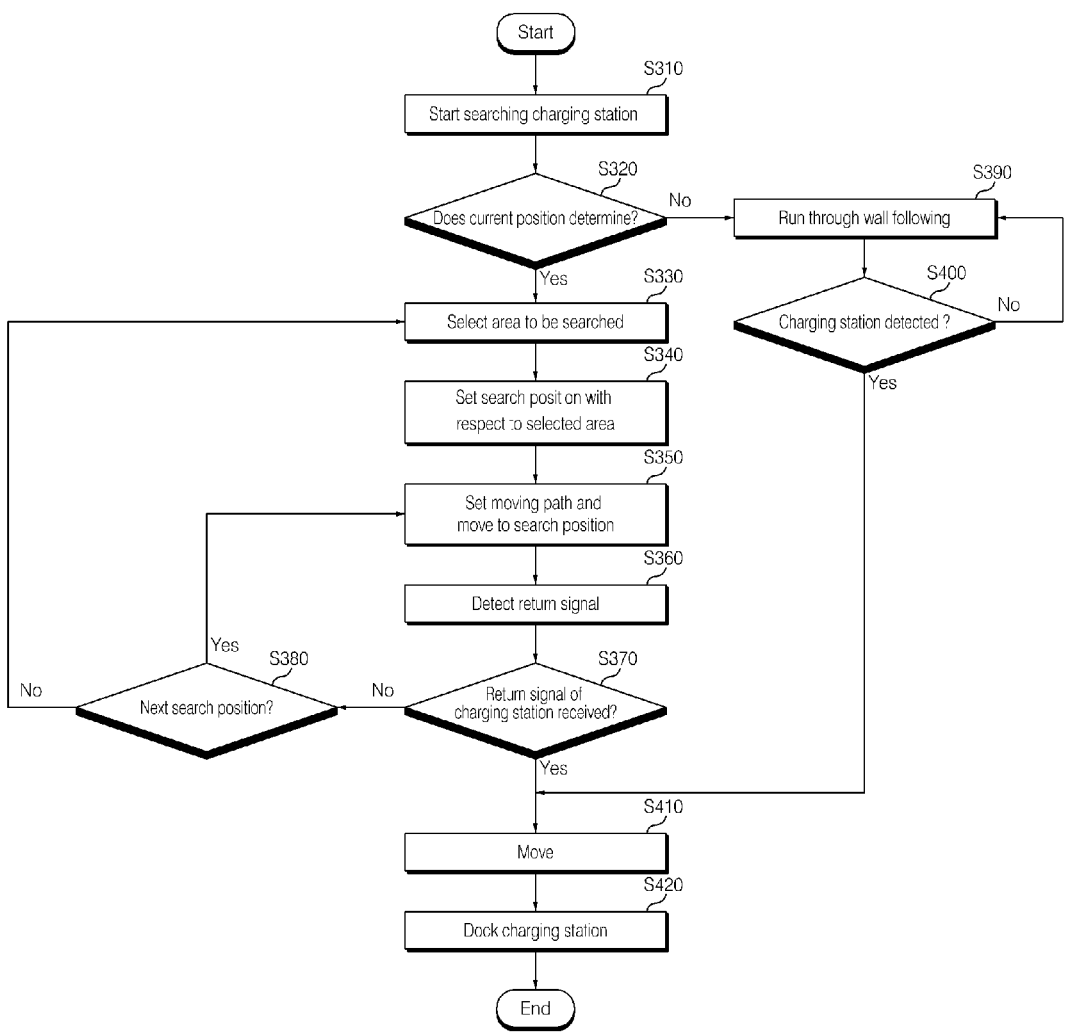
FIG. 14 is a flowchart illustrating a method of searching a charging station according to an embodiment of the present invention.

FIG. 14 is a flowchart illustrating a method of searching a charging station according to an embodiment of the present invention.

As shown in FIG. 14, when a charging capacity of a battery is reduced less than a predetermined value, a moving robot 100 determines to need charging to start searching a charging station (S310).

A control unit 140 confirms a position of the charging station from a map stored in a storage unit 150. When the position of the charging station is set, the control unit 140 moves to the position of the charging station to attempt docking the charging station.

When the position of the charging station is not set on the map, the control unit stops cleaning to search the charging station.

The control unit 140 determines a current position based on a stored map (S320). A learning module 143 of the control unit 140 determines the current position by processing an image in each position acquired through an image acquiring unit 120 to recognize a position of a whole area in connection with a map.

When the current position cannot be confirmed, the moving robot runs through wall track (wall following) (S390), and the control unit 140 detects the charging station (S400). If the control unit 140 detects a charging station return signal during running, the moving robot moves to the charging station to attempt docking (S410, S420).

Meanwhile, when the current position may be confirmed, the control unit 140 matches the current position on the map to select an area to be searched (S330). When there is a plurality of areas to be searched, the control unit 140 selects one area to start searching the charging station. For example, the control unit 140 may start searching the charging station from a current area of the moving robot 100 or may moves to an approximate area to start searching the charging station. In some cases, if one area is selected through a remote controller or a terminal, the control unit 140 moves to a selected area to search the charging station.

The control unit 140 sets a search position with respect to the selected area (S340).

For example, the control unit 140 determines a form of an area based on a stored map. When the determined area is an open area, the control unit 140 may set a center of the area as a search position and may set a plurality of points as the search position according to a size of the area or a detection range. Further, the control unit 140 may extract a line according to a form of an area through session to set a plurality of nodes and may set at least one of a plurality of nodes as the search position.

If the search position is set, the control unit 140 sets a moving path connecting search positions and controls a running unit to move to a search position along a moving path (S350).

A moving robot 100 moves to the search position along a set moving path, rotates at the search position to detect a return signal of the charging station (S360).

If the return signal of the charging station is received through a communication unit (S370), the control unit 140 determines a position of the charging station to control the running unit so that the moving robot moves to the charging station. After the moving robot moves to the charging station, the control unit 140 docks the charging station and charges based on the signal of the charging station (S420).

Meanwhile, when the charging station is not detected in the search position, the control unit 140 controls the running unit 160 so that the moving robot moves to a next search position.

In this case, when a plurality of search positions are set in an area so that there is a next search position (S380), a moving robot moves along a path to a next search position to search the charging station (S350 to S370).

In this case, when one search position is included in the area, since there is no next search position, the moving robot resets a search area and moves to a selected area to continuously search the charging station (S330 to S370).

When the moving robot moves to a final search position set in an area to search the charging station and the charging station is not detected, the control unit 140 resets an area to be searched so that the moving robot moves to a selected area to search the charging station (S330 to S370).

If the return signal of the charging station is received through a communication unit, the control unit 140 determines a position of the charging station and controls the running unit to move to the charging station. After moving to the charging station, the control unit 140 docks the charging station based on a signal of the charging station to charge the charging station (S420).

Figure 15:
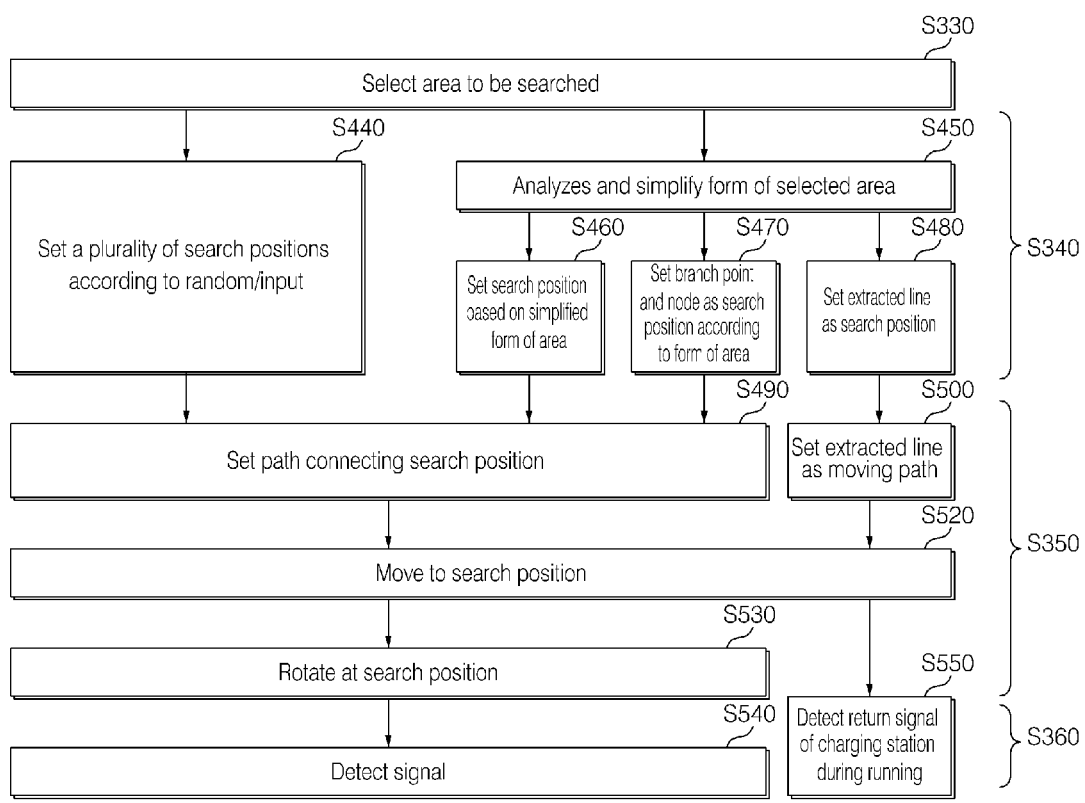
FIG. 15 is a flowchart illustrating a method of configuring a search position when searching the charging station shown in FIG. 14.

FIG. 15 is a flowchart illustrating a method of configuring a search position when searching the charging station shown in FIG. 14.

As shown in FIG. 15, a control unit 140 of a moving robot 100 selects an area to be searched from a plurality of areas (S330).

When the search position is set (S340), the control unit 140 may set a search position according to data input from a remote controller or a terminal, and may randomly set a search position in an area (S440). Further, the control unit 140 may set a central point of an area as a search position.

Further, the control unit 140 analyzes and simplifies a form of a selected area to perform a session operation to extract a line (S450).

The control unit 140 may set a search position based on the simplified form of the area (S460). The control unit 140 sets a node such as a branch point or corners on a line as a search position or sets at least one of a plurality of extracted nodes as a search position based on a line extracted according to a form of an area. In this case, the control unit 140 set at least one node corresponding to a size of an area and a detection range of a moving robot as a search position.

Further, the control unit 140 may set the extracted line as a search position to search the charging station on the line (S480).

If the search position is set, the control unit 140 sets a path so that the moving robot moves (S350).

When a search position is set during setting the path, the control unit 140 sets a moving path connecting search positions to each other. The control unit 140 may set a moving path along a line or may set a moving path connecting the shortest path between search positions (S490).

Meanwhile, when the extracted line is set as the search position, the control unit 140 sets the extracted line as a moving path (S500).

The control unit 140 controls the running unit to move to a search position (S520), and the moving robot rotates at a designated search position to detect a return signal of the charging station (S530)(S540). When the search position is set, the control unit 140 may detect the return signal of the charging station during running.

When the line is set as the search position, the control unit 140 detects the return signal of the charging station during running (S550).

Figure 16:
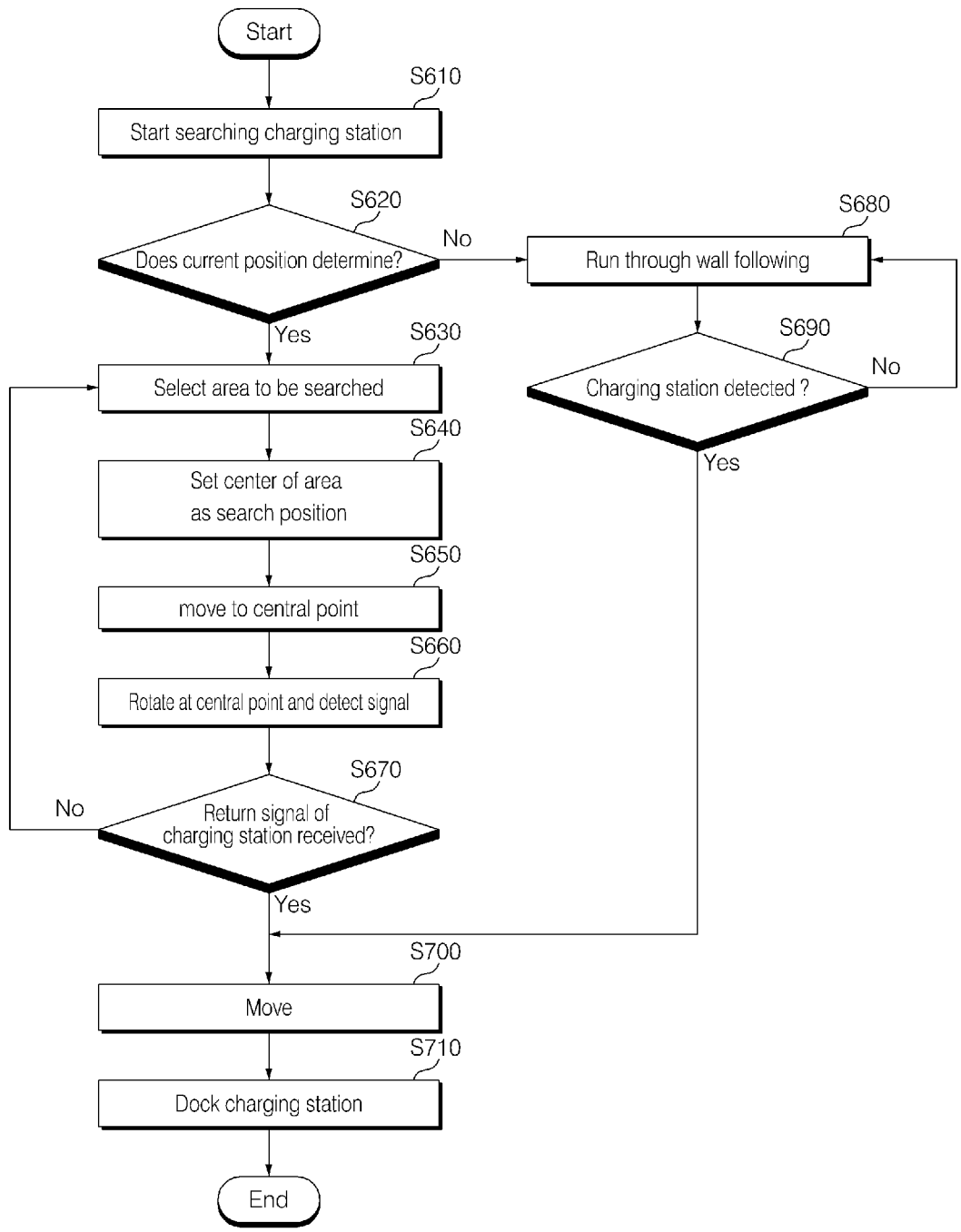
FIG. 16 is a flowchart illustrating a method of searching a charging station of a moving robot by moving an area boundary according to an embodiment of the present invention.

FIG. 16 is a flowchart illustrating a method of searching a charging station of a moving robot by moving an area boundary according to an embodiment of the present invention.

As shown in FIG. 16, the moving robot 100 may set a running path according to an outline shape of an area which is not a search position in an area to search the charging station as shown in FIG. 8(*b*).

When a charging capacity of a battery is reduced less than a predetermined value, a moving robot 100 starts searching a charging station (S730).

A control unit 140 confirms a position of the charging station from a map stored in a storage unit 150. When the position of the charging station is set, the control unit 140 moves to the position of the charging station to attempt docking the charging station.

When the position of the charging station is not set on the map, the control unit stops cleaning to search the charging station.

The control unit 140 determines a current position based on a stored map (S740).

When the current position cannot be confirmed, the moving robot runs through wall track (wall following) (S790), and the control unit 140 detects the charging station (S800). If the control unit 140 detects a charging station return signal during running, the moving robot moves to the charging station to attempt docking (S710, S720).

Meanwhile, when the current position may be confirmed, the control unit 140 matches the current position on the map to select an area to be searched (S750). When there is a plurality of areas to be searched, the control unit 140 selects one area to start searching the charging station.

The control unit 140 sets a running path of an outline shape at a boundary of an area, that is, a location spaced apart from a wall based on a form of an area (S760), and detects a return signal of the charging station while moving along a running path (S770).

The control unit 140 moves until the return signal of the charging station is received. When searching the area is terminated, the control unit 140 moves to a next area to search the charging station.

If the return signal of the charging station is received, the control unit 140 moves to the charging station according to the return signal (S810), and attempts docking the charging station. When the docking is terminated, the control unit 140 receives a charging current from the charging station to be charged (S820).

Accordingly, when charging is required, the moving robot 100 may set a search position by areas according to setting and searches the charging station with respect to a plurality of areas with a small moving amount to be returned to a charging station within a short time.

Although an exemplary embodiment of the present invention has been described with reference to a number of illustrative embodiments thereof, it should be understood that numerous other modifications and embodiments can be devised by those skilled in the art that will fall within the spirit and scope of the principles of the invention.

The present invention provides a moving robot which selectively moves an area based on a stored map to search a charging station within a short time when there is a need for charging due to consumption of a battery, and a controlling method thereof.

In accordance with an aspect of the present invention, there is provided a movable robot including: a movable body; a running unit configured to move the body; a storage unit configured to store a map with respect to a running area; and a control unit configured to recognize a current position and to control the body to run the running area to clean, wherein the control unit sets at least one search position in an area with respect to a plurality of areas included in the running area according to a form of an area, controls the running unit so that the body moves along a moving path connecting the search position, and detects a return signal of a charging station during moving to search the charging station.

In accordance with another aspect of the present invention, there is provided a method of controlling a moving robot, the method including: starting searching a charging station; determining a current position from a stored map to select an area to start searching; setting search positions in the area; setting a moving path connecting the search positions to each other; searching the charging station while moving along the moving path; designating a new area when there is no the charging station and moving to the new area to search the charging station; and moving to the charging station to charge when a return signal from the charging station is detected.

Since the moving robot and a controlling method thereof according to the present invention selectively moves an area based on a stored map to search a charging station, although a position of the moving robot is optionally changed, the moving robot recognizes a position thereof so that it is easy to move between areas and an influence according to complexity of an obstacle is reduced. Since the charging station in an area may be searched through small moving by setting a specific point in the area as a search position to search the charging station, stop of an operation during searching the charging station may be solved and the charging station may be exactly searched within a short time.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A movable robot comprising:
a body;
a running device configured to move the body;
a storage configured to store a map that includes a running region, wherein the running region includes a plurality of areas; and
a controller configured to determine a position of the body and to control the body to move with respect to the running region,
wherein the controller is configured to:
set at least one search position, for detecting a return signal, in an area of the plurality of areas included in the running region according to a shape of an area,
control the running device such that the body is to move with respect to a moving path associated with at least the search position, and
detect the return signal of a charging station during moving of the body of the movable robot,
wherein the controller is configured to:
determine a line based on the shape of the area, and determine a plurality of nodes of the line,
set, as the search position, at least one of the plurality of nodes, and
set the moving path to connect the search position to at least another search position.

2. The movable robot of claim 1, wherein the controller sets, as the search position, at least one of a center of the area, a designated point based on data received from an external device, and a point on a line according to the shape of the area.

3. The movable robot of claim 1, wherein the controller to search the area based on a size of the area, or a size of a detection range of the body.

4. The movable robot of claim 1, wherein the controller sets, as the search position, a corner of the line or a node of a branch point.

5. The movable robot of claim 1, wherein the controller sets, as the search position, a node at a center of the area when a distance between a node and a node on the line is greater than a detection range of the body.

6. The movable robot of claim 1, wherein in order to search for the charging station, the controller controls the body to move along the moving path, controls the body to rotate with respect to the search position, and controls the body to move to a next search position.

7. The movable robot of claim 1, wherein the controller sets, as the search position, the line, and sets the moving path along the line to detect the return signal of the charging station during moving of the body.

8. The movable robot of claim 1, wherein the controller sets the moving path based on a shortest path between the search position and another search position.

9. The movable robot of claim 1, wherein the controller sets the moving path based on a location spaced from a wall of the area by a predetermined distance to search for the charging station during moving of the body.

10. The movable robot of claim 1, further comprising an image acquiring device configured to acquire an image,
wherein the controller compares an acquisition image from the image acquiring device with an image stored at the storage, and the controller determines a current position of the body with respect to the map.

11. The movable robot of claim 10, wherein when the charging station is detected based on the return signal, the controller moves the body to the charging station and stores a position of the charging station based on a position of the body.

12. A method of controlling a movable robot, the method comprising:
determining a position of the movable robot from a map in order to select an area to search for a charging station;
setting search positions in the area, wherein the setting of the search positions includes:
determining a line based on a shape of the area, and
determining a plurality of nodes of the line and setting at least one of the plurality of nodes as one of the search positions;
setting a moving path to connect at least two of the search positions;
searching for the charging station while the movable robot is moving with respect to the moving path;
when the charging station is not in the area, moving the movable robot to a new area based on the moving path in order to search for the charging station; and
when a return signal from the charging station is detected, moving the movable robot to the charging station.

13. The method of claim 12, wherein the setting of the search positions includes setting, as at least one of the search positions, at least one of a center of the area, a designated point based on data received from an external device, and a point according to a shape of an area.

14. The method of claim 12, further comprising searching the area based on a size of the area, or a size of a detection range of the movable robot.

15. The method of claim 12, wherein setting the search positions includes, setting, as one of the search positions, a corner of the line or a node of a branch point.

16. The method of claim 12, wherein the searching for the charging station includes:
moving the movable robot to the search position and rotating the movable robot with respect to the search position; and
moving the movable robot to a next search position when the return signal is not detected.

17. The method of claim 15, wherein setting the moving path includes connecting the search positions along the line or connecting a shortest path between the search positions.

* * * * *